US012650972B2

(12) United States Patent
Holmes et al.

(10) Patent No.: US 12,650,972 B2
(45) Date of Patent: *\*Jun. 9, 2026*

(54) APPLICATION DRIVEN DATA CHANGE CONFLICT HANDLING SYSTEM

(71) Applicant: Oracle International Corporation, Redwood Shores, CA (US)

(72) Inventors: Madeleine Dawn Holmes, Darlington (GB); Surendra Nath V.N.R.K Nukala, Fremont, CA (US); Chaitanyasri Molakalapalli, Hyderabad (IN); Anveshan Reddy Kunduru, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,020

(22) Filed: Jan. 6, 2023

(65) Prior Publication Data

US 2023/0153289 A1 May 18, 2023

Related U.S. Application Data

(63) Continuation of application No. 16/843,665, filed on Apr. 8, 2020, now Pat. No. 11,567,923.

(60) Provisional application No. 62/857,760, filed on Jun. 5, 2019.

(51) Int. Cl.
*G06F 16/23* (2019.01)
*G06F 16/245* (2019.01)

(52) U.S. Cl.
CPC ........ *G06F 16/2308* (2019.01); *G06F 16/245* (2019.01)

(58) Field of Classification Search
CPC .......................... G06F 16/2308; G06F 16/245
See application file for complete search history.

(56) References Cited

U.S. PATENT DOCUMENTS

| | | | |
|---|---|---|---|
| 6,536,014 B1 * | 3/2003 | McClannahan | G06F 30/30 716/102 |
| 7,716,247 B2 * | 5/2010 | Brjazovski | G06F 9/52 707/999.1 |
| 8,229,726 B1 * | 7/2012 | Magdon-Ismail | G06F 30/33 703/22 |
| 9,239,858 B1 | 1/2016 | Willeford | |
| 9,842,031 B1 | 12/2017 | Kharatishvili | |
| 10,095,763 B1 | 10/2018 | Colgrove et al. | |
| 11,068,462 B1 | 7/2021 | Grzech et al. | |
| 2002/0138483 A1 | 9/2002 | Bretl et al. | |

(Continued)

*Primary Examiner* — Alicia M Willoughby
(74) *Attorney, Agent, or Firm* — Invoke

(57) ABSTRACT

Techniques for handling data access conflicts are disclosed. In some embodiments, a conflict handling system detects a set of one or more objects that are currently being accessed by an application. The conflict handling system queries a database to determine whether the set of one or more objects have changes pending. Responsive to determining that an object has a change pending, the conflict handling system identifies and loads, at runtime of the application, a set of one or more application-specific rules that are defined for handling data conflicts. The conflict handling system executes the rules to generate a conflict resolution result for the object. The application may then perform an application-specific function based on the conflict resolution result.

20 Claims, 4 Drawing Sheets

(56) References Cited

U.S. PATENT DOCUMENTS

| | | | |
|---|---|---|---|
| 2004/0230621 A1 | 11/2004 | Croisettier et al. | |
| 2005/0108295 A1 | 5/2005 | Karimisetty et al. | |
| 2005/0198055 A1 | 9/2005 | Mihaila et al. | |
| 2006/0248128 A1 | 11/2006 | Acharya et al. | |
| 2006/0288173 A1 | 12/2006 | Shen | |
| 2007/0118572 A1 | 5/2007 | Fischer et al. | |
| 2007/0180075 A1 | 8/2007 | Chasman et al. | |
| 2007/0219976 A1 | 9/2007 | Muralidhar et al. | |
| 2007/0283011 A1* | 12/2007 | Rakowski | H04L 41/0803 |
| | | | 709/225 |
| 2008/0005332 A1 | 1/2008 | Pande et al. | |
| 2009/0007260 A1* | 1/2009 | Winje | G06F 21/604 |
| | | | 715/810 |
| 2009/0300017 A1 | 12/2009 | Tokusho et al. | |
| 2009/0327817 A1 | 12/2009 | Iyengar et al. | |
| 2010/0010801 A1* | 1/2010 | Meijer | G06F 40/221 |
| | | | 704/9 |
| 2010/0070949 A1* | 3/2010 | Rama | G06F 8/70 |
| | | | 717/125 |
| 2010/0174694 A1 | 7/2010 | Staebler et al. | |
| 2011/0016099 A1 | 1/2011 | Peer et al. | |
| 2012/0102473 A1* | 4/2012 | Lebert | G06F 8/4434 |
| | | | 717/151 |
| 2013/0179868 A1* | 7/2013 | Greifeneder | G06F 11/3624 |
| | | | 717/130 |
| 2014/0201331 A1 | 7/2014 | Kershaw et al. | |
| 2014/0249875 A1* | 9/2014 | Junker | G06Q 10/06 |
| | | | 705/7.11 |
| 2015/0012399 A1* | 1/2015 | Ceribelli | G06Q 50/01 |
| | | | 705/34 |
| 2015/0032710 A1 | 1/2015 | Latrous et al. | |
| 2015/0378972 A1* | 12/2015 | Kapadia | G06F 40/197 |
| | | | 715/229 |
| 2017/0235710 A1 | 8/2017 | Simons et al. | |
| 2017/0270136 A1* | 9/2017 | Chen | G06F 16/178 |
| 2018/0089299 A1 | 3/2018 | Collins et al. | |
| 2018/0196645 A1* | 7/2018 | Buckley | G06F 8/35 |
| 2018/0260258 A1 | 9/2018 | Wester | |
| 2019/0018858 A1 | 1/2019 | Krishnamachari-Sampath et al. | |
| 2019/0163632 A1 | 5/2019 | Walker et al. | |
| 2019/0205244 A1 | 7/2019 | Smith | |
| 2019/0340166 A1 | 11/2019 | Raman et al. | |
| 2019/0340168 A1* | 11/2019 | Raman | H04L 67/1008 |
| 2019/0347167 A1 | 11/2019 | Wang et al. | |
| 2020/0151279 A1 | 5/2020 | Haberstroh | |
| 2020/0272619 A1 | 8/2020 | Alferov | |

* cited by examiner

100

| APPLICATION 102A | ... | APPLICATION 102N |

| TRANSACTION MONITOR 110 | RULE ENGINE 116 | RULE EDITOR 118 |

TRANSACTION FRAMEWORK 106

| TRANSACTION DATABASE 108 | APPLICATION DATABASE 110 | RULE REPOSITORY 112 |

DATA REPOSITORY
104

APPLICATION DRIVEN DATA CHANGE CONFLICT HANDLING SYSTEM

INCORPORATION BY REFERENCE; DISCLAIMER

Each of the following applications are hereby incorporated by reference: application Ser. No. 16/843,665, filed Apr. 8, 2020 and application No. 62/857,760, filed Jun. 5, 2019. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to concurrency control and data conflict handling systems. In particular, the present disclosure relates to a framework for injecting application-specific functionality into resolving data conflicts when multiple applications are concurrently accessing or otherwise operating on the same data.

BACKGROUND

Many computing systems allow concurrent access to stored data. For example, a multiuser database system may execute, in parallel, multiple transactions submitted by different users to modify data stored in an underlying database. When multiple users are attempting to change the same data, there is a risk of users overwriting each other's amendments without proper locking or conflict handling mechanisms. As a result, data may become corrupted and unreliable within the system.

To maintain data consistency, database systems may provide a locking mechanism to restrict simultaneous access to the same database data. For example, database sessions may be configured to lock either pessimistically or optimistically. With pessimistic locking, if a user has selected a record for an update, the record is locked to prevent other users from initiating another update operation on the record until the pending update is committed or rolled back. In contrast, optimistic locking allows multiple users to concurrently select a record for update but prevents a user from committing an update if the record has changed since the time the user selected the record for the update.

Pessimistic and optimistic locking are typically enforced at the data layer by a database system. Thus, multiple applications may initiate database transactions without having to check for potential data inconsistency. However, enforcing locks purely at the data layer limits the ability to interpret what a data conflict represents at the application layer. A locking technique may be optimal in one application context but inefficient in another context. Consequently, these enforcement mechanisms may lead to inefficient locks and resource utilization.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
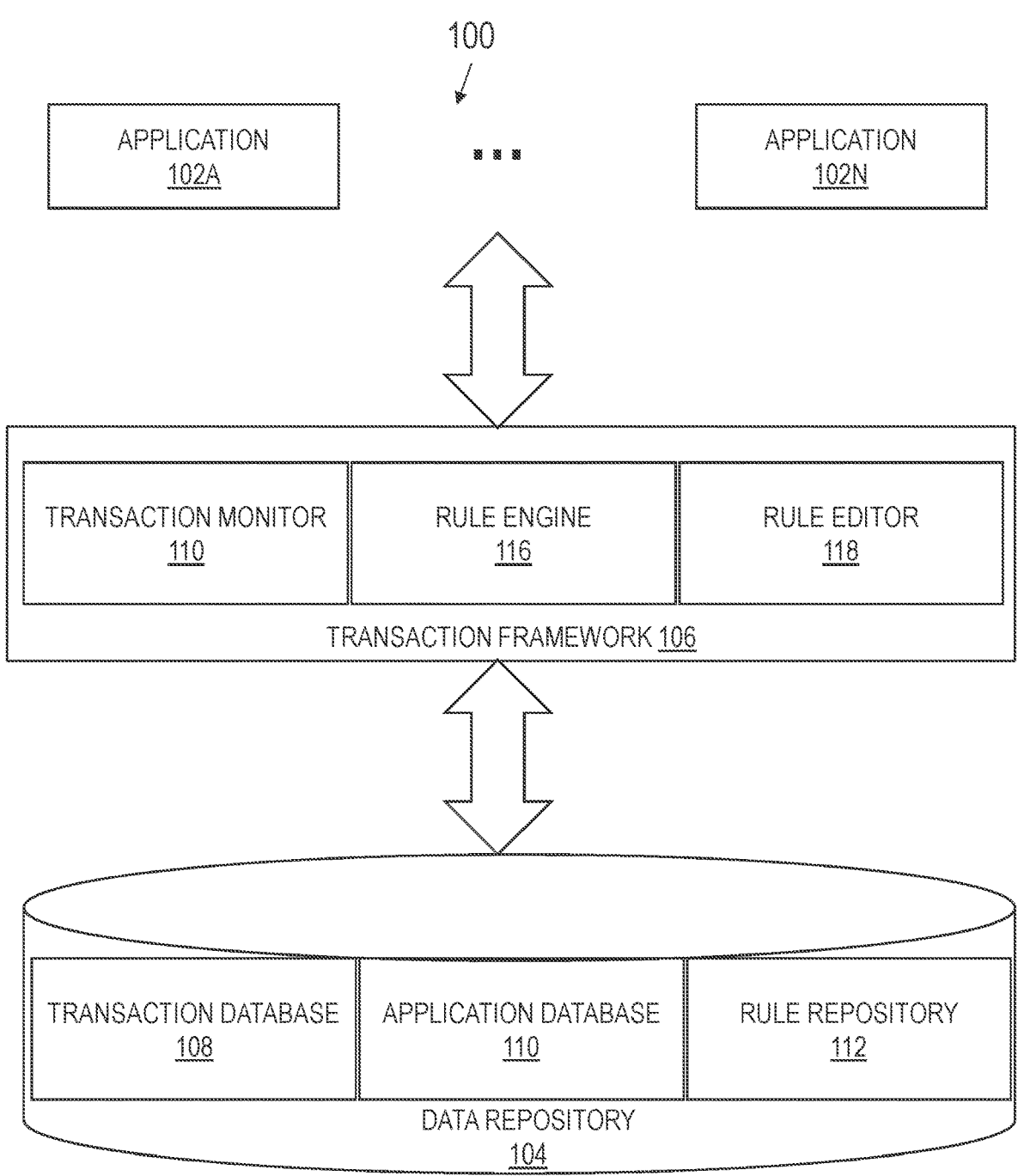
FIG. 1 illustrates an example system for handling data change conflicts in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 DATA CONFLICT CHECKS
4.0 CONFLICT MONITORING AND RULE EVALUATION
5.0 CUSTOMIZABLE RESPONSES TO DATA CONFLICTS
6.0 COMPUTER NETWORKS AND CLOUD NETWORKS
7.0 MICROSERVICE APPLICATIONS
8.0 HARDWARE OVERVIEW
9.0 MISCELLANEOUS; EXTENSIONS 1.0 General Overview Systems and methods described herein allow for application-specific conflict handling of concurrent changes to data. In some embodiments, a conflict handling system is configured to grant locks and resolve data conflicts in a manner that is tailored to specific application contexts. For example, the conflict handling system may apply optimistic locking for one application attempting to update a data object and pessimistic locking for another application concurrently attempting to update the same data object. As another example, the conflict handling system may determine whether to override a lock or wait for the lock to be released depending on the current state of the applications attempting to concurrently change the same data object. Thus, conflict resolution may be handled flexibly on a per application basis to optimize performance and enhance application functionality.

In some embodiments, the conflict handling system is configured to identify and load application-specific rules at runtime. Application-specific rules may control how conflicts are resolved for applications attempting to operate on the same data object. Application-specific rules may vary from one application to the next, allowing for customized conflict resolution. If application-specific rules have not been defined for a given application, then the conflict handling system may use a set of default rules to facilitate application integration with the conflict handling system.

In some embodiments, the conflict handling system monitors data conflicts between a set of user-interface applications. A user-interface application may be any computing application that provides an interface through which users may initiate and submit transactions that access shared data. For example, enterprise system software may include a suite of integrated applications that are supported by the same database. To monitor for data conflicts, the conflict handling system may track the pending and draft data change transactions in the database. The conflict handling system may compare these transactions to data changes initiated or submitted through user interface applications, thereby providing a bridge between the application layer and the data layer. If a conflict is detected, then the conflict handling system may evaluate the corresponding rules for the user interface application to determine how to proceed.

In addition or as an alternative to submitting transactions via user interface interactions, applications may initiate and submit transactions that access shared data via an application programming interface (API) endpoint. For example, an application may programmatically send requests to update, read, and/or write database data responsive to a detected event or on a periodic basis via the API endpoint. The applications may automatically initiate the transactions without any input from a user via a user interface.

In some embodiments, conflict checks may be triggered at various stages or events of an application flow for a given application. Example stages or events that may trigger a conflict check include, but are not limited to, at the time of launching an application flow, at the time of reloading a transaction, at the time of submitting a transaction from the application flow, at the time of resuming a transaction from the application flow, and/or at the time of bypassing a transaction from the application flow. User interface applications may pass event markers to the conflict handling system to identify which stage of the application flow triggered a conflict check. Additionally or alternatively, the application-specific rules that are applied may vary depending on the current stage of the application flow. For example, a conflict detected at the time of launching an application flow may be handled differently than at the time of submitting a transaction from the application flow.

In some embodiments, user-interface applications are configured to perform application-specific functions based on conflict resolution results. For example, the user-interface application may generate and/or render a user interface based at least in part on the conflict resolution result. If a conflict is detected, the user interface may present a warning, prevent rendering of user-interface objects associated with the conflict, restrict the functions available to be performed through the application flow, and/or perform other customized actions.

One or more embodiments described in this Specification and/or recited in the claims may not be included in this General Overview section.

2.0 System Architecture

FIG. 1 illustrates system 100 for handling data change conflicts in accordance with some embodiments. As illustrated in FIG. 1, system 100 includes applications 102*a-n*, data repository 104, and transaction framework 106. System 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Applications 102*a-n* are a plurality of computing applications with access to shared data within data repository 104. In some embodiments, each application provides a user interface, comprising hardware and/or software configured to facilitate communications between a user and the application. An application may be configured to render user interface elements and receives input via user interface elements. Example interfaces include, but are not limited to, a graphical user interface (GUI), a web interface, a command line interface (CLI), a haptic interface, and a voice command interface. Example user interface elements include, but are not limited to, checkboxes, radio buttons, dropdown lists, list boxes, buttons, toggles, text fields, date and time selectors, command lines, sliders, pages, and forms.

Additionally or alternatively, applications 102*a-n* may be configured to interact with one or more other components of system 100 via API endpoints. An API is a programmatic interface that comprises endpoints to a request-response messaging system. An API may be exposed via the web, such as via a Hypertext Transfer Protocol (HTTP) based server. Additionally or alternatively, an API may provide an interface between different application layers executing on the same or different network hosts.

In some embodiments, applications 102*a-n* are different applications in an integrated suite of applications. Each application may comprise software and/or hardware for performing a set of one or more application-specific functions. For example, an enterprise management (EM) system may include, but is not limited to, a set of interrelated applications for testing, deploying, operating, monitoring, diagnosing, and/or resolving problems among deployed hardware and/or software resources. As another example, an enterprise resource planning (ERP) system may, include, but is not limited to, a set of interrelated applications for managing employees, coordinating sales, providing customer services, automating accounting operations, and/or supporting business intelligence (BI) operations. Additionally or alternatively, applications 102*a-n* may include other applications that share access to data stored in data repository 104.

One or more of applications 102*a-n* may be a cloud service, such as a software-as-a-service (SaaS) or a web service. Users may access cloud services using a client, such as a web browser, mobile application, or other software application communicatively coupled to a network. The client may interact with cloud services using one or more communication protocols, such as HTTP and/or other communication protocols of the Internet Protocol (IP) suite. Additionally or alternatively, one or more of applications 102*a-n* may be locally accessible to a user, such as a desktop or other standalone application.

Data repository 104 may be any type of storage unit and/or device (e.g., a file system, database, collection of tables, or any other storage mechanism) for storing data. Further, data repository 104 may include multiple different storage units and/or devices. The multiple different storage units and/or devices may or may not be of the same type or located at the same physical site. Further, data repository 104 may be implemented or may execute on the same computing system as one or more of applications 102*a-n* and/or transaction framework 106. Alternatively or additionally, data repository 104 may be implemented or executed on a computing system separate from the other components of system 100. A data repository 104 may be communicatively coupled to one or more components illustrated in system 100 via a direct connection or via a network.

Data repository 104 may include transaction database 108, application database 110, and rule repository 112. Transaction database 108 tracks pending transactions initiated by applications 102*a-n* for updating data in application database 110. Transaction database 108 may store various details about the pending transactions. Example details may include, but are not limited to, an application identifier that indicates which application initiated a transaction, object identifiers for the database records or other objects that are pending changes, and/or user information identifying details about the role and privileges of a user that initiated the transaction.

Application database 110 stores shared data for applications 102*a-n*. For example, an ERP system database may store, among other data, employee records subject to updates from applications for managing promotions, assignments, terminations, salaries, and/or other employee information. As another example, an EM system may store data identifying patch levels, performance metrics, topologies, detected problems, and/or other attributes about computing resources in a datacenter. Conflicts may arise when two or more applications attempt to concurrently update the same data, such as the same database record.

Rule repository 112 stores application-specific rules for handling conflicts. In some embodiments, application-specific rules are class files that are loadable by a virtual machine, such as a java virtual machine (JVM), and implement an abstract class or an interface. An abstract class or interface may define a set of abstract methods, where an abstract method is a method that is declared without any defined implementation. Application-specific implementations for the abstract method may be defined in the class files that extend the abstract class. Thus, different class files may define different application-specific method implementations of the abstract method to handle conflicts. In other embodiments, abstract classes or interfaces may define default implementations for conflict resolution methods. If no application-specific implementation has been defined, then the virtual machine may load the default implementation to handle conflicts. Otherwise, the virtual machine may load the application-specific implementation, which overrides the default implementation. Additionally or alternatively, other interpretable or executable formats may be used to define the rules, depending on the particular implementation.

Transaction framework 106 may include transaction monitor 114, rule engine 116, and rule editor 118. Transaction monitor 114 captures details about pending transactions and stores these details in transaction database 108. As previously mentioned, these details may include, but are not limited to, application information, user information, and/or object information. Transaction monitor 114 may compare data changes being made via a user interface with pending and draft change transactions to determine whether any affected objects match. A match represents a potential conflict and may be evaluated by rule engine 116.

Rule engine 116 loads and evaluates rules to determine how to resolve potential conflicts based on the matches made by transaction monitor 114. If two or more applications are attempting to modify the same data objects, then rule engine 116 may load the class files for one or more of the applications and execute the application-specific method handling implementations. The rules may include operations for acquiring, overriding, and/or otherwise negotiating locks. Additionally or alternatively, the rules may control how an application proceeds in the presence of a lock.

Rule editor 118 provides an interface through which users may create and register application-specific rules with transaction framework 106. For example, rule editor 118 may allow developers or other users to register class files on a per application basis. Additionally or alternatively, rule editor 118 may include a GUI, which may guide a user through the process of defining a classes or other rule files.

Additional embodiments and/or examples relating to computer networks and microservice applications are described below in Section 6.0, titled "Computer Networks and Cloud Networks" and Section 7.0, titled "Microservice Applications".

3.0 Conflict Handling Rules

In some embodiments, a conflict handling rule receives input information about a potential data access conflict and outputs a conflict resolution result. Example rule input information may include, but is not limited to, object identifiers for each object subject to potentially conflicting concurrent accesses, application identifiers for the applications attempting the concurrent accesses, status information identifying a current status for the applications attempting the concurrent accesses, user information for the users of the applications, and event information identifying the event triggering a conflict check. The conflict resolution result may be generated as a function of the input information in an application-specific manner to signal how the conflict was or should be resolved.

Application-specific rules may define varying conflict resolution results for different application contexts. In one application context, an application may determine that an application flow should be locked to prevent the application from concurrently accessing a data object. In a different application context, the same application may determine that the application flow may proceed with accessing the data object, but in a read only format. In other contexts, an application may determine that changes to a data object may be merged with or override concurrent changes made by another application.

A rule may define an application context in a variety of ways based on one or more of the rule input parameters. In some embodiments, a rule may define an application context as a function of which applications are attempting to concurrently change a data object. The rule may give an application precedence over other applications to make changes based on the application attributes. For example, an application may be attempting to increase the salary field in an employee database record concurrently while another application is migrating the record as part of a termination process. A custom-defined rule might give the termination process precedence to make the change, thereby locking the application flow for the salary increase application. In other implementations, the custom-defined rule may give the salary increase application precedence to change the record, give precedence to the application that first initiated the change transaction via the application's user interface or give precedence to the application that first submitted the change transaction to the database.

Additionally or alternatively, a rule may define an application context based on one or more attributes of users attempting to concurrently make data changes. For example, a user may have a particular role, such as an administrative role, and/or be associated with other attributes that are given precedence. In the context of a suite of EM applications, for instance, an application administrator may be given precedence over a database administrator to reconfigure application resources, and the database administrator may be given precedence to reconfigure database resources. If the two concurrently submit changes, then the rule may resolve the conflict based on which user has precedence to make modifications to the data object.

Additionally or alternatively, a rule may define an application context based current stage of the application flows attempting to concurrently change a data object. As previously indicated, example stages may include, but are not limited to, at the time of launching an application flow, at the time of reloading a transaction, at the time of submitting a transaction from the application flow, at the time of resuming a transaction from the application flow, and/or at the time of bypassing a transaction from the application flow. A rule may allow an application flow to access an object, subject to a conflicting access, in read only format at the time of launching an application flow. However, read access to the object may be prevented at the time the application submits a transaction if the conflict has not been resolved by then. In other implementations, the rule might allow the application to access an object without conflict at the time of launching the application flow and merge changes when submitting the transaction. For instance, one application may be attempting to modify the salary field of an employee while another application may be attempting to concurrently modify the bonus field. The changes to the different fields may be merged into a single database record if the rule allows.

A rule may define a conflict resolution result as a function of one or more application contexts. Example conflict resolution results may include, but are not limited to the following:

NEW: If a pending transaction that concurrently accesses a data object is not considered a conflict;

WARNING: If the pending transaction is a conflict but the application is permitted to proceed with the application flow;

CONFLICT: If the pending transaction is a conflict and the application is not permitted to proceed with the application flow;

SAVE: If the pending transaction is in a saved state and created by the same user and same application flow; and SAVE CHILD: If the pending transaction is in a saved state and created by the same user and is part of a different application flow.

The conflict resolution results provide a signal to applications on how a conflict was or should be resolved. The application may use the signal flags to execute application-specific functions to account for the data change conflict result.

As previously mentioned, an application-specific rule may implement an abstract method for an abstract class or interface. For example, an abstract method may have the signature public String getConflictSignal(TxnObject beingChanged, TxnObject found, String eventMarker). The method is passed in two objects and an event marker identifying an event that triggered the conflict check. Specifically, the input parameters in the signature include:

beingChanged representing a user interface object that is loaded when the application flow is launched;

Found representing a retrieved transaction, which may be pending approval, in a draft state, or approved and committed during the time the current data was changed; and eventMarker including a string value based on the call point that triggered the conflict check The method returns the conflict resolution result as a string (e.g., "NEW", "WARNING", "CONFLICT", "SAVE", "SAVE_CHILD"). It is noted that the data types and formats of the input parameters and outputs may vary from implementation to implementation.

In some embodiments, the input parameters of type TxnObject, such as beingChanged and Found, include the following attributes-value pairs of TABLE 1 below.

TABLE 1

| EXAMPLE USER INTERFACE OBJECT ATTRIBUTES | |
|---|---|
| Attribute | Holding Value |
| Application Identifier | A name of the application flow that is being loaded or has a pending transaction |
| Object | A table name storing the record being changed |
| Object Identifier | A primary key of the record being changed |
| Status | A current status for a transaction on the object |
| Created by | A user name and/or role for the user that initiated the transaction |

Additionally or alternatively, the input parameters may include other information, depending on the particular implementation.

Example keys that may be used for eventMarker include, but are not limited to the examples listed in TABLE 2 below.

TABLE 2

| EXAMPLE EVEN IT MARKER KEY VALUES | |
|---|---|
| Key | Meaning |
| INITIAL_LOAD | Conflict check triggered at the time data is being loaded by a user interface |
| SUBMIT | Conflict check triggered at the time an application has submitted a transaction |
| RELOAD | Conflict check triggered at the time of reloading a transaction |
| BYPASS | Conflict check triggered at the time of bypassing a transaction |

Additionally or alternatively, other key values may be used to identify different stages of an application flow that trigger conflict checks.

In some embodiments, an application-specific rule maps different conflict resolution results to different combinations of input parameters that define varying application contexts. For example, TABLE 3 includes an example application-specific rule to resolve conflicts for a promotion application flow.

TABLE 3

| EXAMPLE RULE IMPLEMENTATION |
|---|

```
public class PromotionsConflictMatchingImpl implements TxnMatching {
    public String getConflictSignal (TxnObject uiObject, TxnObject pendingObject, String eventMarker)
    {
        if (uiObject.getObject( ).equals("PER_ALL_ASSIGNMENT_M") &&
        pendingObject.getObject( ).equals("PER_GRADE_F")) {
```

TABLE 3-continued

EXAMPLE RULE IMPLEMENTATION

```
        return TxnMatching.CONFLICT;
    }
    else if (uiObject.getObject( ).equals("PER_ALL_ASSIGNMENT_M") &&
    pendingObject.getObject( ).equals("PER_ALL_ASSIGNMENT_M")) {
        return TxnMatching.WARNING;
    }
    return TxnMatching.NEW;
}
```

The example rule implementation returns "CONFLICT" if a promotion assignment is pending and a grade assignment has been initiated, "WARNING" if a promotion assignment is pending and has again been initiated, and "NEW" in all other cases. As previously indicated, the application contexts and corresponding conflict resolution results may vary from implementation to implementation.

4.0 Conflict Monitoring and Rule Evaluation

During runtime, transaction framework 106 may monitor for concurrent accesses to data objects by applications 102a-n. If a match is detected, then rule engine 116 may evaluate the potential conflict based on the applicable rules. Rule engine 116 may return the conflict resolution result to transaction framework 106 and/or the applications attempting the conflicting accesses.

Figure 2:
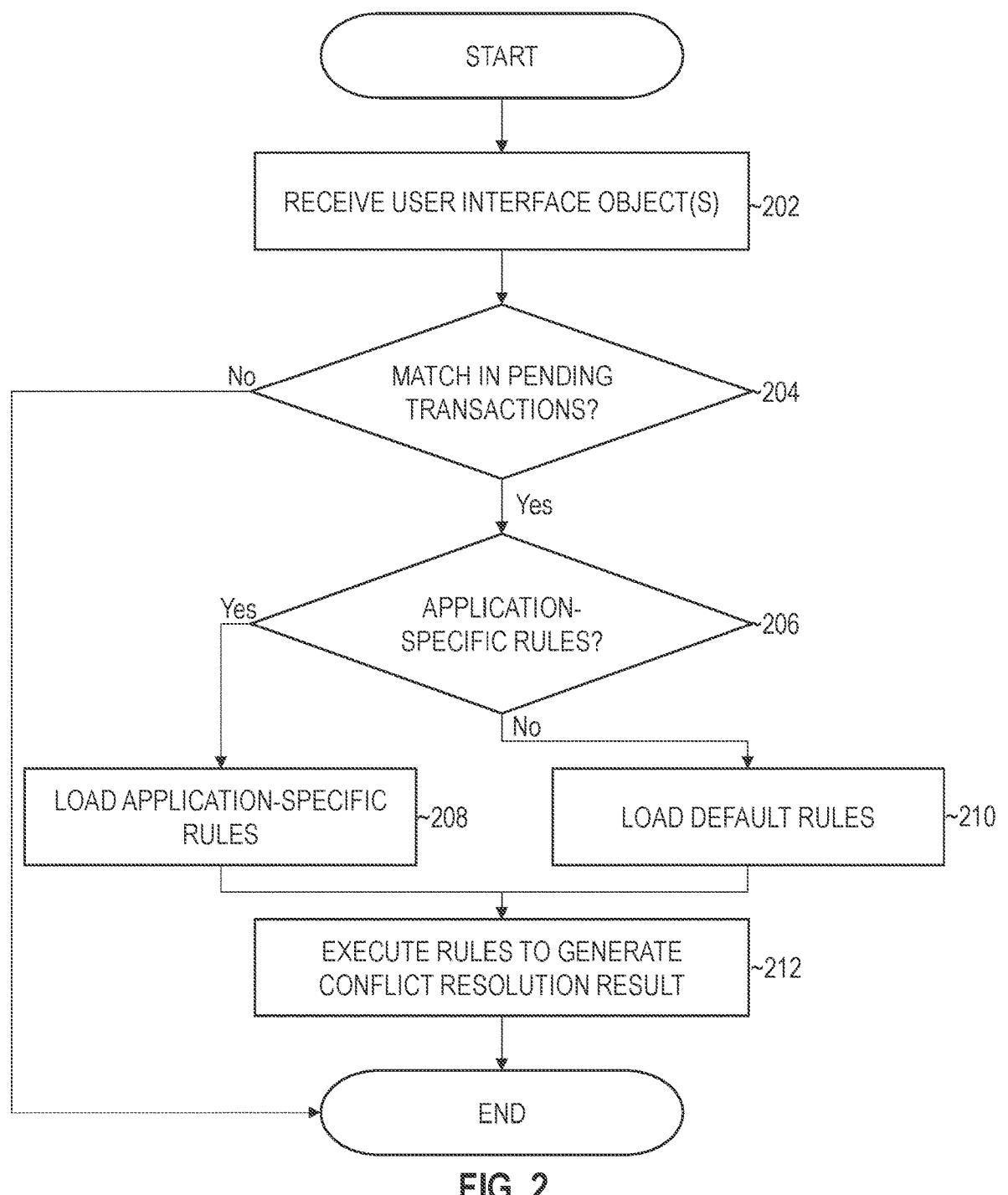
FIG. 2 illustrates an example set of operations for identifying and handling data access conflicts in accordance with some embodiments.

FIG. 2 illustrates an example set of operations for identifying and handling data access conflicts in accordance with some embodiments. One or more operations illustrated in FIG. 2 may be modified, rearranged, or omitted all together. Accordingly, the particular sequence of operations illustrated in FIG. 2 should not be construed as limiting the scope of one or more embodiments.

The set of operations include receiving a set of one or more objects that are part of a user interface page (operation 202). For example, as a user may navigate through webpages or other GUI pages of an EM or ERP application. A page may include GUI objects that allow a user to modify or otherwise access underlying data objects. For instance, an ERP application flow may include a page including a set of GUI elements that allow a user to submit salary modifications for one or more employees. The GUI elements may be linked to one or more database records in an employees table. The ERP application may pass the user interface object information to transaction monitor 114.

Responsive to receiving the set of one or more objects, rule engine 116 invokes transaction monitor 114, which queries transaction database 108 to determine whether any of the one or more objects match objects in pending transactions (operation 204). In some embodiments, a match is detected if an object identifier for a user interface object matches an object identifier in transaction database 108. As previously indicated, an object identifier may be a primary key of a database record. In other embodiments, the object identifier may be a string or other value that uniquely identifies a data object.

If a match is detected, then rule engine 116 determines whether application-specific rules exist for the application (operation 206). For example, rule engine 116 may check an application identifier included with the matched user-interface objects to application identifiers associated with rules registered with rule repository 112.

If found, the application-specific rules are loaded by rule engine 116 (operation 208). As previously indicated, the application-specific rules may be a class file, which may be loaded into memory by a virtual machine, such as a JVM, or interpreter at runtime. In other embodiments, other interpretable or executable formats may be used, such as extensible markup language (XML) or JavaScript Object Notation (JSON) files.

If application-specific rules have not been found, then rule engine 116 loads a set of default rules (operation 210).

Rule engine 116 next executes the rules to generate and return a conflict resolution result (operation 212). If the application-specific rules have been loaded, then rule engine 116 executes the conflict handling logic included therein. For instance, rule engine 116 may execute the example rule implementation illustrated in TABLE 3 for the promotion application if a conflict is detected. If the grade application is attempting a concurrent change to a data object, then the conflict resolution result "CONFLICT" may be returned. If another promotion application instance is attempting to modify the same data object, then the conflict resolution result "WARNING" may be returned. Otherwise, rule engine 116 may return the conflict resolution result "NEW". Other signals may also be returned depending on the particular rule implementation and the application context.

As previously mentioned, an application may trigger conflict checks at various stages of an application flow. In some embodiments, applications request a conflict check at the time an application flow is loaded. For example, a user may launch, via a GUI, a particular application flow to initiate a transaction. In response, the application may pass objects that are part of the GUI of the application flow to rule engine 116 for conflict checks. Rule 116 may return the conflict resolution result for each object to the application.

Additionally or alternatively, an application may trigger a conflict check at the time of reloading a transaction. After an application has initiated a transaction, a user may request that the transaction be saved to be completed at a later time. In other cases, a transaction may be saved awaiting approval from another user before completion. In the context of an ERP system, for instance, a conflict may arise in the following scenario:

At time t1, a first user submits a first transaction to promote an employee without a salary change, where the changes to the employee record are not committed to a database until approved by an authorized user;

At time t2, a second user submits a second transaction to change the salary of the employee, where the changes to the employee record are not committed to a database until approved by an authorized user;

At time t3, a first approver opens the second transaction and approves the salary change without conflict;

At time t4, a second approver clicks to edit the first transaction, where, upon being reloaded, a conflict with the salary field in the employee record is detected.

In the above scenario, the second approver may be notified of the conflict via a warning message to indicate that the salary has been updated between the time the transaction was submitted and reloaded. Additionally or alternatively, the change salary user interface object may be disabled or allow the user to view the salary in read only mode. Other application-specific functions may also be triggered responsive to the conflict. Examples are provided further below in Section 5.0, titled "Customizable Response to Conflict Resolution Results".

Additionally or alternatively, an application may trigger a conflict check at the time of submitting a transaction. If application rules permit optimistic locking, then conflicts may arise when two or more transactions have been initiated on the same data object. For instance, a conflict may arise in the following scenario:

At time t1, a first application initiates (e.g., via a user interface or API) a first transaction, receiving the conflict resolution signal "NEW" at the time of loading a first application flow in accordance with application-specific rules registered for the first application;

At time t2, a second application initiates a second transaction, receiving the conflict resolution signal "NEW" at the time of loading a second application flow in accordance with application-specific rules registered for the second application;

At time t3, the second application submits the second transaction without conflict;

At time t4, the first application submits the first transaction, which attempts to modify a data object that was changed by the second transaction.

In this scenario, rules engine 116 may notify the first application of a conflict. The first application may then perform one or more application-specific functions in response.

Additionally or alternatively, an application may trigger a conflict check at the time of bypassing a transaction. For example, a user may bypass an approval that may otherwise be part of an application flow. In this scenario, if an application bypasses submission of a transaction on an object, the same object may be locked by another transaction. Therefore, conflict checks may be run to notify the application that submitted the bypass.

Additionally or alternatively, an application may trigger conflict checks at other stages, which may vary from implementation to implementation. For example, a conflict check may be triggered any time new UI objects are loaded by an application or periodically between initiating and submitting a transaction. Each time a conflict check is triggered, rule engine 116 may execute the applicable rules for that stage of the application flow and return the conflict resolution result.

In some embodiments, a rules class may be presented with a plurality of potential conflicts. For example, the following scenario may occur:

At time t1, a first user changes, via a GUI, object x and object y for Promotion and submits;

At time t2, a second user changes object y and object z for Salary Change and submits;

At time t3, a third user changes object x, object y, and object z for Transfer and submits;

When the third user submits the change at time t3, rule engine 116 may detect potential conflicts as follows:

Object x for Promotion;
Object y for Promotion;
Object y for Salary Change; and
Object z for Salary Change.

In the above scenario, rule engine 116 may initially analyze different potential conflicts independently. For example, rules engine 116 may pass matching pairs of changes into the rules to generate a cartesian product of conflict resolutions signals as follows:

get conflict resolution result for (beingChanged 'Object x for Transfer', found 'Object x for Promotion', eventMarker 'on Submit');

get conflict resolution result for (beingChanged 'Object x for Transfer', found 'Object y for Promotion', eventMarker 'on Submit');

get conflict resolution result for (beingChanged 'Object x for Transfer', found 'Object y for Salary Change', eventMarker 'on Submit');

get conflict resolution result for (beingChanged 'Object x for Transfer', found 'Object z for Salary Change', eventMarker 'on Submit');

get conflict resolution result for (beingChanged 'Object y for Transfer', found 'Object x for Promotion', eventMarker 'on Submit');

get conflict resolution result for (beingChanged 'Object y for Transfer', found 'Object y for Promotion', eventMarker 'on Submit');

get conflict resolution result for (beingChanged 'Object y for Transfer', found 'Object y for Salary Change, eventMarker on Submit');

get conflict resolution result for (beingChanged 'Object y for Transfer', found 'Object z for Salary Change, eventMarker 'on Submit');

get conflict resolution result for (beingChanged 'Object z for Transfer', found 'Object x for Promotion', eventMarker 'on Submit');

get conflict resolution result for (beingChanged 'Object z for Transfer', found 'Object y for Promotion', eventMarker 'on Submit');

get conflict resolution result for (beingChanged 'Object z for Transfer', found 'Object y for Salary Change, eventMarker on Submit');

get conflict resolution result for (beingChanged 'Object z for Transfer', found 'Object z for Salary Change, eventMarker 'on Submit');

The cartesian product for the above yields sixteen separate conflict resolution signals for different change pairings.

When there are multiple potential conflicts, rule engine 116 may pass the conflict resolution results into logic to determine the top-level code to be returned to the calling code. In some embodiments, the logic determines what to return based on the relative ranks of the different conflict resolution results. For example, CONFLICT may be assigned the highest rank, WARNING a lower rank, and NEW the lowest rank. In this case, if all the above calls in the previous example returned NEW with the exception of one WARNING for the last call, then rule engine 116 would return WARNING to the calling system. If, instead, the first call returned CONFLICT and the other calls returned WARNING, the rule engine 116 would return CONFLICT as the top-level signal. The calling application may then perform one or more application-specific functions based off the top-level signal. Other rankings and/or logic may also be used to generate a top-level signal, depending on the particular implementation.

5.0 Customizable Responses to Conflict Resolution Results

After a conflict check has been performed, applications may process the conflict resolution result in a manner that is tailored to the application's function. For example, an application may determine whether a particular user interface object is in a NEW, CONFLICT, WARNING, SAVE, OR SAVE_CHILD state. The application may then adjust the display and/or available functions presented through the user interface to the user based on the current state of the user interface object. As another example, the application may adjust the API commands that are available to be submitted via an API endpoint. Additionally or alternatively, other application-specific functions may be triggered. Examples include, but are not limited to, submitting database queries, triggering interrupt signals to other applications, and sending network messages.

Figure 3:
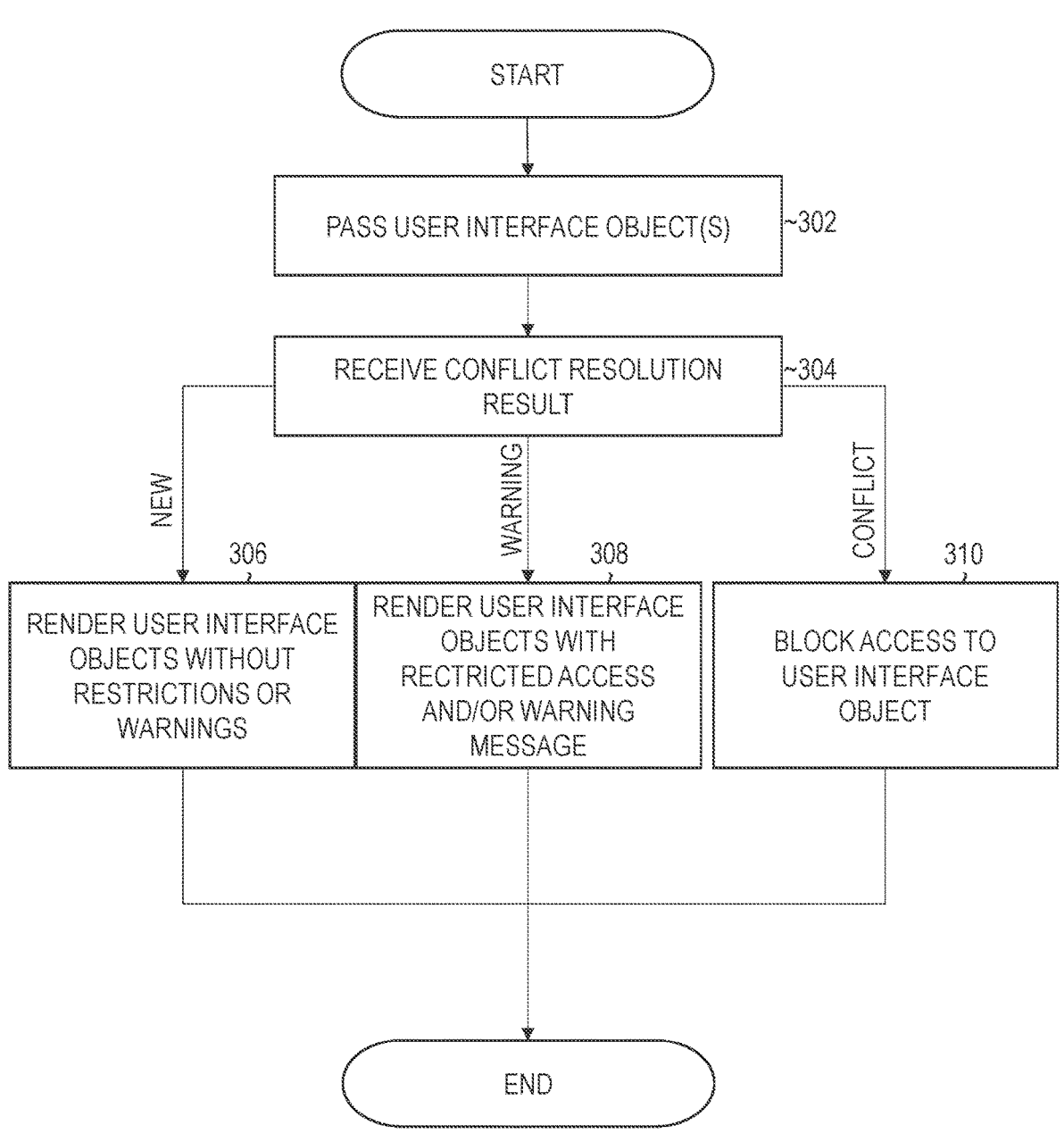
FIG. 3 illustrates an example set of operations for rendering user interfaces based on conflict resolution results in accordance with some embodiments.

As previously indicated, applications may be configured to tailor the generation and display of user interfaces during an application flow as a function of the conflict resolution result. For instance, FIG. 3 illustrates an example set of operations for rendering user interfaces based on conflict resolution results in accordance with some embodiments. One or more operations illustrated in FIG. 3 may be modified, rearranged, or omitted all together. Accordingly, the particular sequence of operations illustrated in FIG. 3 should not be construed as limiting the scope of one or more embodiments.

The process of FIG. 3 includes passing, by an application to rule engine 116, a set of one or more user interface objects to check for conflicts (operation 302). In some embodiments, the user interface object includes the attribute-value pairs depicted in TABLE 1. Thus, the information may identify the table and primary key for an underlying database record subject to being changed via the user interface object. In other embodiments, the user interface object may identify datafiles and/or other types of data objects to check for conflicting change accesses.

Responsive to receiving the user interface objects, rule engine 116 performs a conflict check, as described in the previous section, to generate a conflict resolution result. The application then receives the conflict resolution result from rule engine 116 (operation 304).

The application next processes the conflict resolution result to determine how to render a user interface as part of the application flow. If the conflict resolution result is NEW, then the application may render the user interface objects without any access restrictions or warning messages (operation 306).

If the conflict resolution result is WARNING, then the application renders the user interface with restricted access and/or warning for the affected user interface objects (operation 308). For example, a display region of a GUI may allow read only access to certain data (e.g., via non-editable fields) even though these fields may be fully editable if the conflict resolution result had been returned as NEW. In other cases, the GUI may allow read/write access, but display a warning message that another transaction is also accessing the data. The warning message may provide further information, such as which application and user is concurrently accessing the data.

If the conflict resolution result is CONFLICT, then the application renders the user interface to block access to the affected user interface objects (operation 310). In some cases, the user may be prevented entirely from proceeding with a transaction. In other cases, the user may be permitted to proceed with a transaction for only a subset of object. For example, if a user is attempting to reassign a set of employees to a new manager, there may be a conflict with a subset therein. The application may allow the transaction to proceed with only the data records for which there are no conflicts.

Other application-specific functions may also be applied, depending on the particular implementation. For example, an application may be attempting to submit a salary increase transaction. Between initiating the transaction and submitting the transaction, another transaction may have increased the employee's salary, giving rise to a potential conflict. Upon detecting the conflict, the application may present an option, through the GUI to aggregate the changes (e.g., adding both salary changes together), override the change made by the other transaction, or abandon the transaction. As another example, an application may be attempting to apply a patch to a database server when a separate instance of the application applies a potentially conflicting patch. The application may give the user the option of aggregating the patches, rolling back the previous patch, and/or abandoning the current patch transaction. Additionally or alternatively, application-specific functions may be defined to respond to other types of conflict signals. For example, if a SAVE or SAVE_CHILD signal is received, the application may present an option, through the GUI, to abandon or complete the saved transaction. As can be appreciated, a wide variety of application-specific functions may be implemented to process different conflict resolution signals.

6.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

8.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
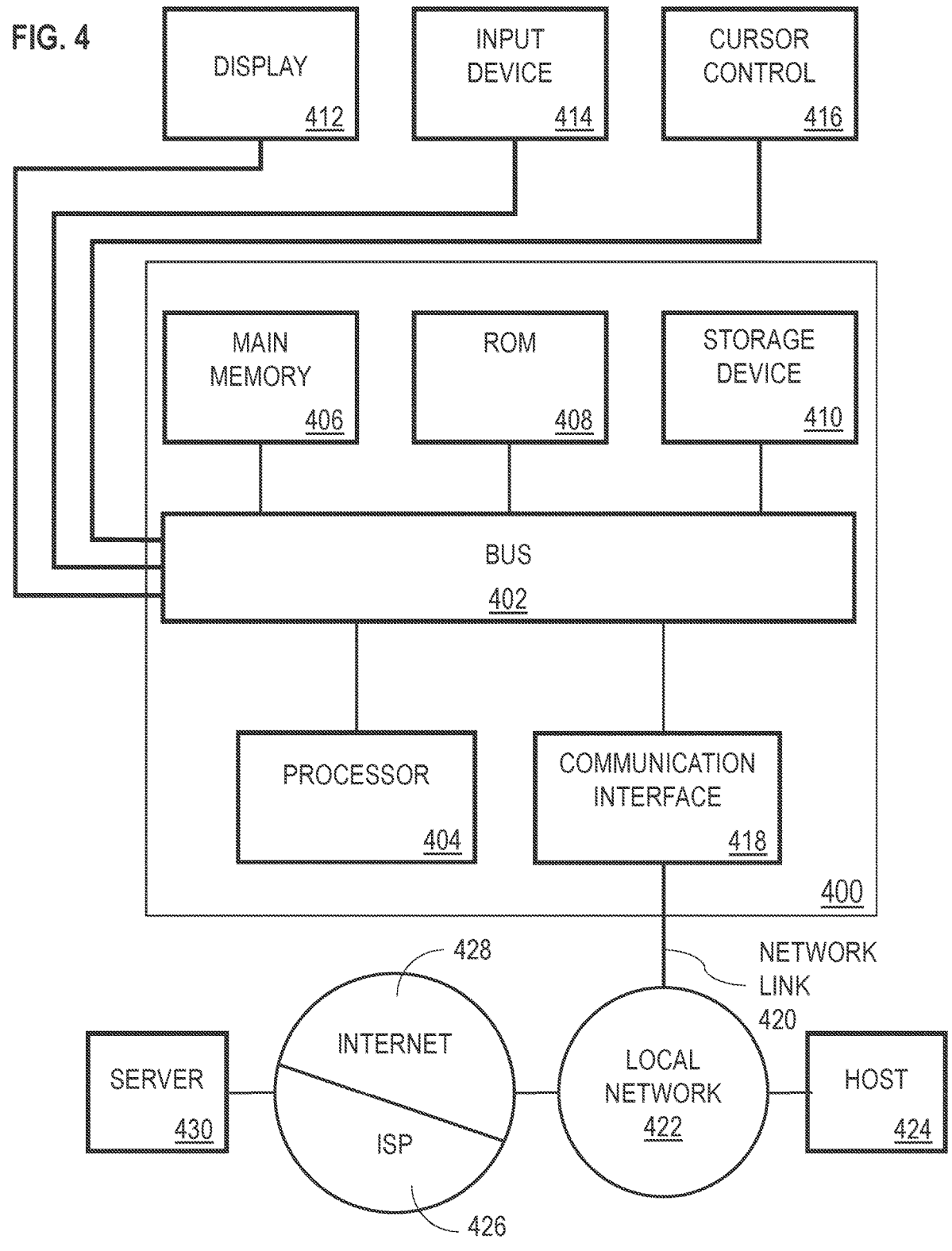
FIG. 4 shows a block diagram that illustrates a computer system in accordance with one or more embodiments.

For example, FIG. 4 is a block diagram that illustrates computer system 400 upon which an embodiment of the invention may be implemented. Computer system 400 includes bus 402 or other communication mechanism for communicating information, and a hardware processor 404 coupled with bus 402 for processing information. Hardware processor 404 may be, for example, a general purpose microprocessor.

Computer system 400 also includes main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes read only memory (ROM) 408 or other static storage device coupled to bus 402 for storing static information and instructions for processor 404. Storage device 410, such as a magnetic disk or optical disk, is provided and coupled to bus 402 for storing information and instructions.

Computer system 400 may be coupled via bus 402 to display 412, such as a cathode ray tube (CRT) or light emitting diode (LED) monitor, for displaying information to a computer user. Input device 414, which may include alphanumeric and other keys, is coupled to bus 402 for communicating information and command selections to processor 404. Another type of user input device is cursor control 416, such as a mouse, a trackball, touchscreen, or cursor direction keys for communicating direction information and command selections to processor 404 and for controlling cursor movement on display 412. Input device 414 typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 400 can receive the data on the network line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

9.0 Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which, when executed by one or more hardware processors, cause:

registering, by an application with a database, a class file that extends an abstract class or interface and includes an application-specific implementation of an abstract method, wherein the abstract method is declared within the abstract class or the interface without any defined implementation, wherein the database registers, for a plurality of different applications, a plurality of different class files that extend the abstract class or the interface and include different application-specific implementations of the abstract method declared within the abstract class or the interface;

sending, by the application to the database, a request to execute a transaction that triggers a conflict check within the database;

receiving, by the application from the database, a result of the conflict check wherein the result is generated by the application-specific implementation of the abstract method, associated with the abstract class or the interface, that is registered with the database, wherein the database identifies which of the plurality of different class files to load to perform the conflict check based on said registering; and performing, by the application, one or more operations to automatically resolve the conflict as a function of the result received by the application from the database.

2. The one or more non-transitory computer-readable media of claim 1, wherein the one or more operations affect the application flow based on a signal flag associated with the result.

3. The one or more non-transitory computer-readable media of claim 1, wherein the result includes a signal flag and the signal flag is one of a warning flag indicating the application is permitted to proceed with an application flow for a given application context, a conflict flag indicating the application is not permitted to proceed with the application flow for the given application context; a save flag indicating a conflicting transaction by the same user and same application flow is pending; or a save child state flag indicating a conflicting transaction by the same user and a different application flow is pending.

4. The one or more non-transitory computer-readable media of claim 1, wherein the result includes a warning flag indicating the application is permitted to proceed with an application flow.

5. The one or more non-transitory computer-readable media of claim 1, wherein the result includes a conflict flag indicating the application is not permitted to proceed with the application flow for the given application context.

6. The one or more non-transitory computer-readable media of claim 1, wherein the result includes a save signal flag indicating a conflicting transaction by the same user and same application flow is pending.

7. The one or more non-transitory computer-readable media of claim 1, wherein the result includes a save child state flag indicating a conflicting transaction by the same user and a different application flow is pending.

8. The one or more non-transitory computer-readable media of claim 1, wherein the result is generated by the application-specific implementation of the abstract method or interface based on a current application context sent by the application to the database, wherein the current application context is passed as input to the implementation of the abstract method or interface.

9. The one or more non-transitory computer-readable media of claim 1, wherein the result includes a signal flag that is generated by the application-specific implementation of the abstract method or interface based on a current stage of an application flow indicated by an event marker sent by the application to the database.

10. The one or more non-transitory computer-readable media of claim 9, wherein the event marker indicates that the application flow is bypassing another transaction, wherein the application-specific implementation of the abstract method or interface generates the signal flag based on the application flow bypassing the other transaction.

11. The one or more non-transitory computer-readable media of claim 9, wherein the event marker indicates that the application flow is initially loading data into a user interface, wherein the application-specific implementation of the abstract method or interface generates the signal flag based on the application flow initially loading data into the user interface.

12. The one or more non-transitory computer-readable media of claim 9, wherein the event marker indicates that the application flow is reloading data into a user interface, wherein the application-specific implementation of the abstract method or interface generates the signal flag based on the application flow reloading data into the user interface.

13. The one or more non-transitory computer-readable media of claim 1, wherein the result is generated as a function of a cartesian product of conflict resolution signals for different pairings of changes requested in the database.

14. The one or more non-transitory computer-readable media of claim 13, wherein the conflict resolution signals are ranked to generate a top-level signal; wherein the top-level signal is returned to the application from the database.

15. The one or more non-transitory computer-readable media of claim 1, wherein the one or more operations include disabling a user interface element within an application flow.

16. A method comprising:

registering, by an application with a database, a class file that extends an abstract class or interface and includes an application-specific implementation of an abstract method, wherein the abstract method is declared within the abstract class or the interface without any defined implementation, wherein the database registers, for a plurality of different applications, a plurality of different class files that extend the abstract class or the interface and include different application-specific implementations of the abstract method declared within the abstract class or the interface;

sending, by the application to the database, a request to execute a transaction that triggers a conflict check within the database;

receiving, by the application from the database, a result of the conflict check wherein the result is generated by the application-specific implementation of the abstract method, associated with the abstract class or the interface, that is registered with the database, wherein the database identifies which of the plurality of different class files to load to perform the conflict check based on said registering; and performing, by the application, one or more operations to automatically resolve the conflict as a function of the result received by the application from the database.

17. A system comprising:

one or more hardware processors;

non-transitory computer-readable media storing instructions, which, when executed by one or more hardware processors, cause:

registering, by an application with a database, a class file that extends an abstract class or interface and includes an application-specific implementation of an abstract method, wherein the abstract method is declared within the abstract class or the interface without any defined implementation, wherein the database registers, for a plurality of different applications, a plurality of different class files that extend the abstract class or the interface and include different application-specific implementations of the abstract method declared within the abstract class or interface;

sending, by the application to the database, a request to execute a transaction that triggers a conflict check within the database;

receiving, by the application from the database, a result of the conflict check wherein the result is generated by the application-specific implementation of the abstract method, associated with the abstract class or the interface, that is registered with the database, wherein the database identifies which of the plurality of different class files to load to perform the conflict check based on said registering; and performing, by the application, one or more operations to automatically resolve the conflict as a function of the result received by the application from the database.

18. The one or more non-transitory computer-readable media of claim 1, wherein the result includes a signal flag that is generated by passing the implementation of the abstract method or interface a set of objects that include an event marker indicating a current stage of the same or different application flows associated with at least one of the transaction and the one or more other concurrent transactions.

19. The method of claim 16, wherein the result includes a signal flag that is generated by passing the implementation of the abstract method or interface a set of objects that include an event marker indicating a current stage of the same or different application flows associated with at least one of the transaction and the one or more other concurrent transactions.

20. The method of claim 16, wherein the result includes a signal flag and the signal flag is one of a warning flag indicating the application is permitted to proceed with an application flow for a given application context, a conflict flag indicating the application is not permitted to proceed with the application flow for the given application context; a save flag indicating a conflicting transaction by the same user and same application flow is pending; or a save child state flag indicating a conflicting transaction by the same user and a different application flow is pending.

\*   \*   \*   \*   \*